United States Patent
Schröter et al.

(10) Patent No.: US 12,084,540 B2
(45) Date of Patent: Sep. 10, 2024

(54) MODIFIED ARYLHYDROXY COMPOUNDS FOR THE PRODUCTION OF POLYURETHANE OR POLYISOCYANURATE

(71) Applicant: BAKELITE GMBH, Iserlohn-Letmathe (DE)

(72) Inventors: Stephan Schröter, Essen (DE); Athina Kerkaidou, Iserlohn (DE); Ganapathy Viswanathan, Louisville, KY (US); Luca Basilissi, Pregnana Milanese (IT)

(73) Assignee: BAKELITE GMBH (DE)

( * ) Notice: Subject to any disclaimer, the term of this patent is extended or adjusted under 35 U.S.C. 154(b) by 112 days.

(21) Appl. No.: 17/513,960

(22) Filed: Oct. 29, 2021

(65) Prior Publication Data
US 2022/0135731 A1 May 5, 2022

(30) Foreign Application Priority Data

Oct. 30, 2020 (EP) .................... 20205059

(51) Int. Cl.
| | |
|---|---|
| *C08G 18/54* | (2006.01) |
| *C08G 8/32* | (2006.01) |
| *C08J 9/14* | (2006.01) |
| *C09D 175/04* | (2006.01) |
| *C09J 175/04* | (2006.01) |

(52) U.S. Cl.
CPC ............ *C08G 18/546* (2013.01); *C08G 8/32* (2013.01); *C08J 9/141* (2013.01); *C09D 175/04* (2013.01); *C09J 175/04* (2013.01); *C08G 2150/00* (2013.01); *C08G 2170/00* (2013.01); *C08J 2375/04* (2013.01)

(58) Field of Classification Search
CPC ........ C08G 18/10; C08G 18/28; C08G 18/32; C08G 18/36; C08G 18/092; C08G 18/163; C08G 18/18; C08G 18/1808; C08G 18/1816; C08G 18/2036; C08G 18/225; C08G 18/4018; C08G 18/4027; C08G 18/42; C08G 18/4829; C08G 18/542; C08G 18/546; C08G 18/79; C08G 2101/00; C08G 2110/005; C08G 2150/00; C08G 2170/00; C08J 9/141; C08J 2203/14; C08J 2375/04; C09D 175/04; C09J 175/04
See application file for complete search history.

(56) References Cited

U.S. PATENT DOCUMENTS

| | | | |
|---|---|---|---|
| 3,800,005 A | | 3/1974 | Sherwood et al. |
| 4,336,025 A | * | 6/1982 | Schneider ........... C09B 67/0089 8/583 |
| 5,032,642 A | | 7/1991 | Lemon et al. |
| 5,340,888 A | | 8/1994 | Lemon et al. |
| 5,795,933 A | | 8/1998 | Sharp et al. |
| 2004/0082713 A1 | | 4/2004 | Tutin et al. |
| 2013/0331511 A1 | | 12/2013 | Kitada et al. |

FOREIGN PATENT DOCUMENTS

| | | | |
|---|---|---|---|
| JP | H05295061 | * | 11/1993 |
| JP | 2005075938 | | 3/2005 |
| JP | 2006273899 | | 10/2006 |
| JP | 2015218191 A | | 12/2015 |

OTHER PUBLICATIONS

European Search Report for priority Application No. EP20205059, dated Apr. 7, 2021.

* cited by examiner

*Primary Examiner* — John M Cooney
(74) *Attorney, Agent, or Firm* — Edmonds & Omaidalka, P.C.

(57) ABSTRACT

Esterified arylhydroxy compounds for the production of polyurethane or polyisocyanurate. In order to provide aromatic polyols for the production of polyurethanes or polyisocyanurates which are process-technically suitable in terms of their viscosity and at the same time give the end product good physical properties and a good reaction to fire, esterified arylhydroxy compounds are proposed as polyols.

16 Claims, No Drawings

MODIFIED ARYLHYDROXY COMPOUNDS FOR THE PRODUCTION OF POLYURETHANE OR POLYISOCYANURATE

CROSS-REFERENCE TO RELATED APPLICATIONS

This application claims priority to European Patent Application having serial number 20205059.7, filed on Oct. 30, 2020. The entirety of which is incorporated by reference herein.

FIELD OF THE INVENTION

Embodiments provided herein relate to polyurethanes.

BACKGROUND OF THE INVENTION

Polyurethanes are one of the most versatile and commercially important plastics. They can be found in furniture, shoe soles, automotive interiors, construction, medical and in many other articles of various uses. Materials based on polyurethanes (PUR) and polyisocyanurates (PIR) have been known for a long time and have been described many times. They are primarily used for insulation with respect to high and low temperatures in the form of rigid foams, for example in refrigerators or pipes, but are also used in the construction industry as, for example, sandwich elements. The PURs are also used in a variety of other applications such as flexible and semi-rigid foams, Coatings, Adhesives, Sealants and Elastomers (CASE).

The preparation is typically carried out via reaction of di- or polyisocyanates with compounds having hydrogen atoms reactive towards isocyanate groups, usually polyols, such as for example polyester polyols and/or polyether polyols in the presence of polyurethane catalysts, chain extenders and/or crosslinking agents, blowing agents and further auxiliaries and additives. Whereas during the preparation of polyurethanes the diisocyanate and the polyol are reacted in proportion to the molecular masses, during the preparation of polyisocyanurates, the diisocyanate is present in excess. This component then partly reacts with itself and a very highly crosslinked plastic is formed having ring-like structures (formation of trimers) which confer a high dimensional stability, hardness, stiffness and an exceptional thermal resistance upon the rigid polyisocyanurate foam.

PIR possesses a low thermal conductivity and is therefore very well suited as an insulating material for insulating flat roofs having increased requirements for compressive loading, such as for example parking roofs, but also for flooring, basement ceilings, top-floor ceilings and as interior insulation. However, these materials have the disadvantage that they are very brittle, that is to say they possess only inadequate elastic deformability, which limits their scope of application.

When preparing typical rigid polyurethane foams, the highly exothermic reaction between polyols and isocyanates leads to internal crust formation. This phenomenon disadvantageously impairs the physical properties of the foam and increases the likelihood of causing problems with respect to flammability. Moreover, the use of organic blowing agents based on hydrocarbons increases the flammability of the finished foams. Consequently, flame-retardant additives are added to the formulation, these generally being halogenated compounds which are highly questionable from an environmental point of view.

The properties of the end product are essentially determined by the choice of the polyol, chain length (and molecular weight) and the degree of branching of the polyol component (dictated by functionality), meaning that combinations of different polyols, for example polyether polyols, polyester polyols and polyester ether polyols, are frequently employed in order to optimize processing and properties.

In the world of rigid foams, aromatic polyester polyols and aliphatic polyether polyols are the most common ones. Aromatic polyols, particularly, the aromatic polyether polyols are relatively less known class of compounds. While the use of aromatic polyols confers good properties upon the polyurethane end products in terms of reaction to fire along with other benefits, they are difficult to use in existing processes on account of the high viscosity. For instance, inter alia, unmodified arylhydroxy-aldehyde-condensates, such as novolacs and the alkoxylated novolacs are known polyols in the polyurethane industry (WO 2018/172222 A1). The novolac polyols are examples of aromatic polyols and their alkoxylated versions are aromatic polyether polyols. The viscosity issues are more prevalent with novolacs and the alkoxylated novolacs of higher hydroxyl value (OHV) and higher functionality. These are addressed by increasing the chain length of the alkoxylation.

However, it has been found that, when using the arylhydroxy-aldehyde condensates such as the novolacs or the alkoxylated arylhydroxy-aldehyde-condensates such as the alkoxylated novolacs as polyols in polyisocyanurate-dominated materials, the functionality of these polyols typically being well above 2, poses challenges in using them as a direct drop-ins.

The well-known strategy to alter the functionality of the novolac based aromatic polyols and its derivatives, the aromatic polyether polyols, is to increase or reduce the molecular weight of the precursor novolak. The molecular reduction needed to reduce functionality of a novolac or that of an alkoxylated novolack is substantial. This puts a limitation to the use of novolac based polyols in applications such as PIR foams and CASE where a functionality close to 2 is desirable because such a reduction in functionality through the molecular weight reduction cannot be achieved without running into severe regulatory hurdles.

There are applications within the realm of PUR where higher functionality polyols (3 or higher for example) are desirable as in the case of rigid foams for example. The aromatic polyesters that enhance fire properties of the PU foam is insufficient to provide the required mechanical properties owing to its typically low functionality (ca. 2). Therefore, aliphatic polyether polyols are used which can have functionality anywhere between 3 to 4.8. Some examples include simple polyols such as glycerol, trimethylol propane and their alkoxylated derivatives, alkoxylated sugars etc. These aliphatic polyols, however, lack the necessary reaction to fire properties. Novolac based alkoxylated or non-alkoxylated polyols are a better fit in such applications. Owing to its arylhydroxy backbone, they are thermally resistant and comes with a functionality typically 2.6 and above.

One interesting feature of these novolac-based polyols is that their hydroxyl numbers remain essentially the same across a wide range of functionality. For example, a 3-functional novolac or alkoxylated novolac and a 4-functional novolac or alkoxylated novolac (of the same degree of alkoxylation) have essentially the same OHV (hydroxyl value). This is because, the molecular weight and therefore, functionality increase is achieved simply by increasing the same arylhydroxy methylene repeat units. The compact high aromaticity of novolacs results in high modulus (improved mechanical property) but also leads to brittleness similar to that of the aromatic isocyanates. This is why, the high isocyanate containing PU rigid foams also suffer due to increase in brittleness.

Therefore, there exists a need to develop a process by which the functionality of these arylhydroxy compounds such as novolac based aromatic polyols and aromatic polyether polyols can be reduced without resorting to a substantial decrease in the molecular weight of the arylhydroxy-aldehyde or novolac itself and increased through an alternate approach other than merely increasing the same type of arylhydroxy methylene linkages, which could also potentially deliver some unexpected improvements in the properties of the finished polyurethane article.

Thus, there exists a need for polyols that possess the aromaticity derived from the arylhydroxy backbone with functionality and viscosity that can fit a wide spectrum of PUR and PIR applications such as foams and CASE.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various embodiments and across the figures provided herein. This repetition is for the purpose of simplicity and clarity and does not in itself dictate a relationship between the various embodiments and/or configurations. Moreover, the exemplary embodiments presented below can be combined in any combination of ways, i.e., any element from one exemplary embodiment can be used in any other exemplary embodiment, without departing from the scope of the disclosure.

It is one object of the present invention to provide aromatic polyols for the preparation of polymers, in particular based on polyurethane and polyisocyanurate, which with respect to their viscosity are suitable from a process engineering standpoint and simultaneously confer upon the end product good physical properties, in particular mechanical properties that include compressive strengths and dimensional stability, and a superior reaction to fire.

This objective can be achieved according to the invention by an esterified alkoxylated or esterified non-alkoxylated arylhydroxy compound which is prepared by reaction of an alkoxylated or non-alkoxylated arylhydroxy compound with a monocarboxylic acid, a dicarboxylic acid and/or anhydrides thereof and/or carboxylic acid halides (carbonyl halides).

The use of the esterified alkoxylated or non-alkoxylated arylhydroxy compounds according to the invention as polyol component which is the isocyanate-reactive component makes it possible to provide polyols having varied OH functionality (hydroxyl functionality) in particular for the preparation of polyurethanes and polyisocyanurates. These polyols can be designed to have OH functionality anywhere between 1 and 10. Those with a OH functionality of say, 1.5 to 2.5 are a good fit especially for certain applications such as PIR foams, thermoplastic polyurethanes (TPU) elastomers and CASE. The properties of the end product, such as mechanical property and reaction to fire, can be influenced as required. The higher functionality ones such as 3 or greater are well suited for PUR foams, particularly, the rigid foams.

The aromatic content of the esterified arylhydroxy compound combined with the presence of the carboxyl group can improve the reaction to fire, with the proportion of flame retardants being able to be reduced or the use thereof dispensed with completely. Further, since the esterification is built on an aromatic background, these polyols are expected to improve mechanical properties, particularly the compressive strengths, moduli etc. The aromatic background which provide the hydrophobicity coupled with the carboxyl groups and alkoxylation in some cases, provide the right balance in solubility characteristics leading to better compatibility with other polyols such as aromatic polyester polyols (APP), aliphatic polyether polyols and even the isocyanates, which are also aromatic in nature and furthermore, compatibility with blowing agents.

As arylhydroxy compound, arylhydroxy condensates (can be used interchangeably with the terms resins or copolymers) and arylhydroxy components themselves can be used. The term "arylhydroxy compounds" therefore includes, for example, substituted and unsubstituted phenol, cresol, xylenol, alkylphenols, arylphenols, phenols having a plurality of hydroxyl groups, such as for example dihydroxybenzenes (e.g. resorcinol, hydroquinone, pyrocatechol), trihydroxybenzenes (e.g. pyrogallol) inter alia, arylhydroxy-aldehyde resins, such as for example phenol formaldehyde resins. The phenol-formaldehyde resins can be resols and novolacs although novolacs are preferred. The arylhydroxy-aldehyde resins may also include bisphenol F (Bis F), modified novolacs such as bisphenol A novolacs. The arylhydroxy compound may also be arylhydroxy-ketone condensate such as bisphenol A. The arylhydroxy compound may also be lignins of various kinds such as lignosulfonate, Kraft, pyrolytic, soda ash, organosolv etc. The arylhydroxy compounds of this invention can be alkoxylated or non-alkoxylated.

It has been found particularly preferable to use esterified alkoxylated as well as non-alkoxylated novolac, having a molar mass Mn (number average molecular weight, determined by vapor pressure osmometry) of 270-4000 g/mol, more preferably 375 to 2010 g/mol, for the use for preparing polyurethanes and polyisocyanurates. The molecular weights of the esterified arylhydroxy compounds are largely dictated by the molecular weight of the arylhydroxy compound that is used to esterify and also by the selection of the esterifying agent. The advantage of reducing functionality via esterification is that this step causes only a small incremental increase in molecular weight as described in the later sections. And the choice of the arylhydroxy compound depends on number of factors such as the desired level of aromaticity, hydroxyl number (OHV), functionality and the end application.

The uniqueness of the esterified arylhydroxy compounds of this invention is that they can have either lower or higher functionality than the precursor arylhydroxy compound. In some applications involving polyisocyanurate such as rigid foams or thermoplastic polyurethanes such as in elastomers, a functionality less than 2.5 or closer to 2 is critical to avoid premature cross-linking. The invention employs esterified (alkoxylated or non-alkoxylated) novolacs which on account of the esterification with certain acids (as discussed in the later sections) have a lower OH functionality, namely in general between 1.8 to 2.8. Through the use of such polyols with lower functionality (<3), the degree of crosslinking of the polymer is lowered and more flexible materials are obtained. The use of esterified novolacs also leads to the reduction of the exothermicity during the crosslinking process, as a result of which the internal pyrolytic decompositions are avoided, which has positive effects on the physical properties.

The esterified alkoxylated arylhydroxy compound is prepared by first reacting the arylhydroxy compound with an alkoxylating agent followed by an esterification reaction to result in an esterified alkoxylated arylhydroxy compound.

The alkoxylated arylhydroxy compound is generally prepared in an alkaline medium at temperatures of between 120° C. and 200° C. The arylhydroxy compound (e.g. novolac) is initially charged, melted and an alkaline catalyst is added with stirring in the form for example of potassium carbonate, sodium carbonate, potassium hydroxide, sodium hydroxide, potassium alkoxides, sodium alkoxides, calcium hydroxide, calcium oxide, amines or triphenylphosphine. The alkoxylating agent is subsequently added. The arylhydroxyl group (OH) of the arylhydroxy compound: alkoxylating agent molar ratio is preferably from 1:0.1 to 1:30. The degree of alkoxylation can be controlled depending on the proportion of alkoxylating agent used. The degree of alkoxylation of the arylhydroxy compound is preferably from 5% to 100%, more preferably 30% to 100%. As a result of partial ethoxylation, phenolic OH groups, which do not undergo esterification reaction for example with carboxylic acids in a useful yield, remain on the arylhydroxy compound. This makes it possible in turn to specifically influence properties in the polymeric composition, for example polyurethane/polyisocyanurate polymer.

The alkoxylating agent used is preferably ethylene oxide and/or ethylene carbonate and/or propylene oxide and/or propylene carbonate and/or butylene oxide and/or butylene carbonates, other alkoxylating agents known from the prior art also being able to be used. It is particularly preferable for the alkoxylated arylhydroxy compound used to be ethoxylated and/or propoxylated and/or mixtures thereof.

It is particularly preferable for the esterified arylhydroxy compound to be an esterified phenol formaldehyde resin.

To illustrate the alkoxylation reaction, the reaction of a phenol novolac having an average OH functionality of 3 with ethylene carbonate may be shown here in simplified form and by way of example (reaction I):

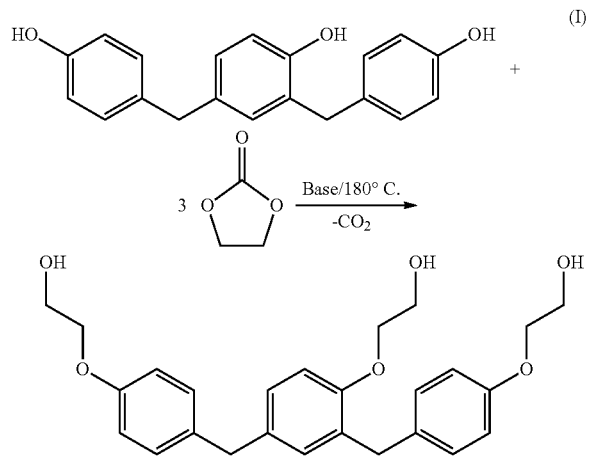

In the scheme above, all the phenolic hydroxyls of the novolaks are consumed to result in ethoxylated novolac. However, as described in the earlier section, by employing less than one equivalent of alkoxylating agent for every phenolic hydroxyl, some phenolic hydroxyls can still exist in the final esterified product.

The use of propylene oxide and/or propylene carbonate leads to formation of further isomers, since two different carbon atoms are able to react. In addition, stereoisomers can be formed.

It is also possible to use a polyalkoxylated novolac (novolac polyether polyol). "Polyalkoxylated novolacs" are understood to mean products for the alkoxylation of which one or more alkoxylating agents are used in a molar ratio of 1:>1, based on a phenolic OH group of the novolac. Novolacs having a polyether chain length of preferably from 1-30, more preferably 1-5, can be used here. For example, polyethoxylated novolacs (novolac polyether polyols) can therefore be used. The following structure (II) may be given here by way of example:

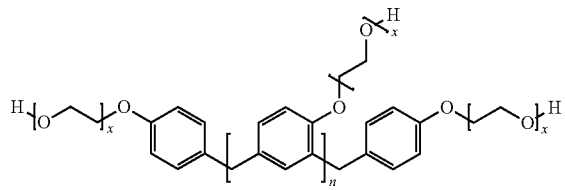

where
n=0-10
x=>1-30

Different novolacs can also be alkoxylated simultaneously with identical or different alkoxylating agents.

It is also possible for different alkoxylated novolacs, such as for example ethoxylated novolac and propoxylated novolac, to be mixed together in different proportions. For instance, a physical mixture for example of alkoxylated novolac (co-condensate) and/or ethoxylated novolac and/or propoxylated novolac is conceivable.

After the alkoxylation reaction, the alkoxylated arylhydroxy compound will be neutralized with various acids (inorganic or organic acid). A neutral product is preferred for use as polyol in the polyurethane preparation. Preference is given to neutralization, for example, with a compatible organic (such as e.g. acetic acid, benzoic acid, phthalic acid, lactic acid, anthranilic acid or salicylic acid) and/or inorganic acid (such as e.g. hydrochloric acid, sulfuric acid, phosphoric acid or nitric acid).

The alkoxylated or non-alkoxylated arylhydroxy compound is then subjected to an esterification reaction. For this purpose, it is reacted with monocarboxylic acids, dicarboxylic acids and/or anhydrides thereof and/or carbonyl halides. The choice of esterification agent depends on the alkoxylated or non-alkoxylated arylhydroxy compound to be esterified. For example, it has been found that the esterification of non-alkoxylated novolacs proceeds most efficiently with anhydrides and/or carbonyl halides. The esterification of alkoxylated novolacs can, in contrast, be realized sufficiently rapidly with monocarboxylic acids, dicarboxylic acids and/or anhydrides thereof and/or carbonyl halides.

The monocarboxylic acids are particularly preferably selected from compounds of the following general structural formula (III):

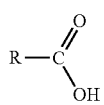

Where R is: H or C1-C10-alkyl group (branched or unbranched), or C2-C10-alkenyl group (branched or unbranched), or cycloaliphatic group (substituted or unsubstituted) or aryl group (substituted or unsubstituted) or aralkyl group (substituted or unsubstituted) or alkylaryl group (substituted or unsubstituted). R can also be or include heteroatoms, such as nitrogen, phosphorus, sulfur or halogens.

It is particularly preferable if the monocarboxylic acid used is formic acid and/or acetic acid and/or propionic acid and/or caprylic acid and/or benzoic acid and/or mixtures thereof. Further preference is given to the use of formic acid and acetic acid here because the use of additional catalysts can be dispensed with, yet the esterification still proceeds relatively rapidly. An additional catalyst (e.g. p-toluenesulfonic acid) for accelerating the esterification needs to be neutralized again after the reaction. However, neutralization increases the concentration of Na+/K+ ions in the product, which in turn results in an undesired acceleration of the reaction between polyisocyanate and polyol component when preparing polyurethanes/polyisocyanurates.

The use of benzoic acid has the advantage that it is readily commercially available and improve the reaction to fire of the polymeric composition by increasing the aromatic content in said polymeric composition. The use of amino acids (e.g. glycine) or else caprylic acid as esterification agent is also possible.

Reaction (IV) shows by way of an example and in simplified form the partial esterification of a monoethoxylated novolac having an OH functionality of 3. Reaction with a carboxylic acid in the molar ratio of 1 mol of novolac polyol and 1 mol of carboxylic acid reduces the OH functionality from an average of 3 to an average of approx. 2.

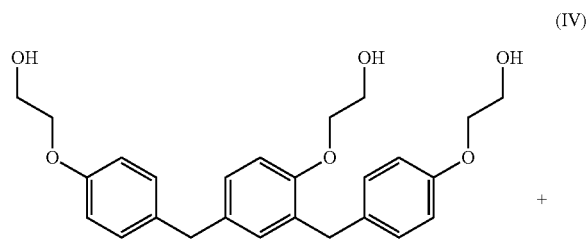

(IV)

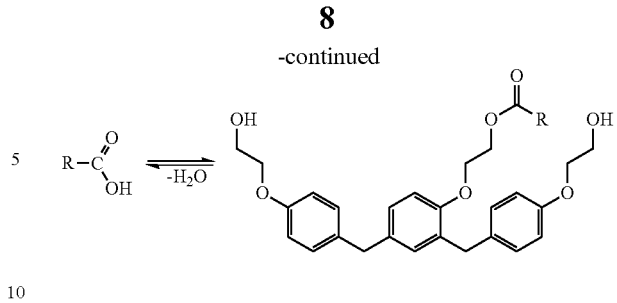

It is evident from reaction IV that the final molecular weight of the esterified ethoxylated novolac polyol is largely dictated by the molecular weight of the ethoxylated novolac. This is especially significant if the molecular weight of the ethoxylated novolac is high and the monocarboxylic acid is a small molecule such as formic acid.

Hereinafter (reaction (V)), the partial esterification of a novolac polyol having an OH functionality of 4 is illustrated by way of example. By selecting the appropriate molar ratio, an average OH functionality of approx. 2 is likewise obtainable via this route.

(V)

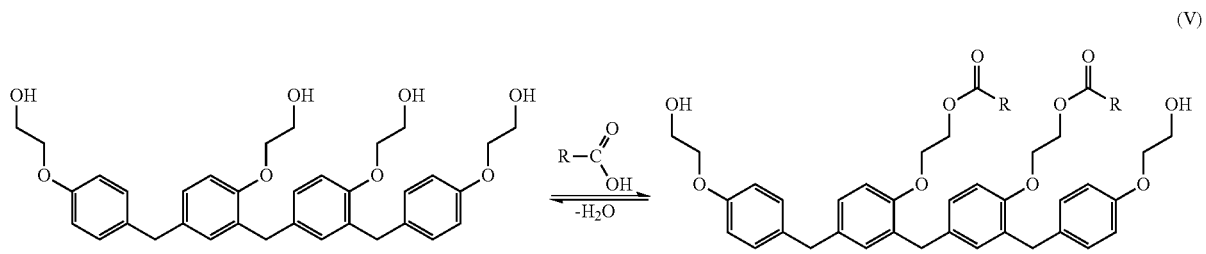

Polyethoxylated or general polyalkoxylated novolacs (novolac polyether polyols) react in the same way.

Structure (VI) shows a simplified general structure of a partial esterified alkoxylated (and non-alkoxylated for x=0) phenol novolac.

(VI)

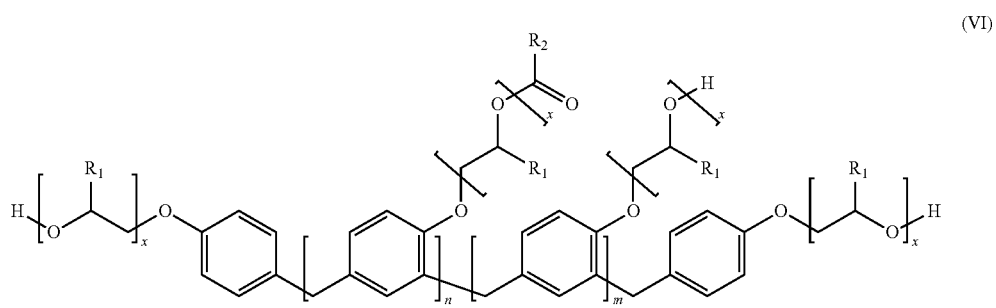

where
n=0.01-10 R1=H, C1-C4 alkyl
m=0.01-10 R2=H, alkyl, aryl
x=0-30

The esterification can also take place with the use of dicarboxylic acids (saturated or unsaturated), such as for example adipic acid, fumaric acid, maleic acid, isophthalic acid, phthalic acid, terephthalic acid, succinic acid and/or mixtures of these, with partial crosslinking taking place on account of the difunctionality. It has been found that the viscosity of the esterified arylhydroxy compound can be influenced in a controlled manner in this way, which can be advantageous for specific polymeric compositions. Unlike monocarboxylic acid, the use of dicarboxylic acid with an arylhydroxy compound of functionality >2 such as phenolic novolac leads to increase in functionality. When dicarboxylic aids are used, only one mole of the acid is needed for two moles of the arylhydroxy compound.

Carboxylic anhydrides are also suitable as co-reactants for the esterification of alkoxylated or non-alkoxylated arylhydroxy compounds. For example, acetic anhydride, succinic anhydride, phthalic anhydride, isophthalic anhydride, maleic anhydride or tetrahydrophthalic anhydride and/or mixtures thereof are usable. Carboxylic anhydrides are particularly useful to esterify the phenolic hydroxyls (OH group) since these arylhydroxys do not react (or react only very slowly) with acids unlike their alkoxylated derivatives. The cyclic anhydrides produce the same effect as the dicarboxylic acids in the sense that half a molar equivalent of these relative to the arylhydroxy compound with a functionality >2 also results in the increase in functionality as demonstrated in the scheme (VII) below where in f stands for functionality.

(VII)

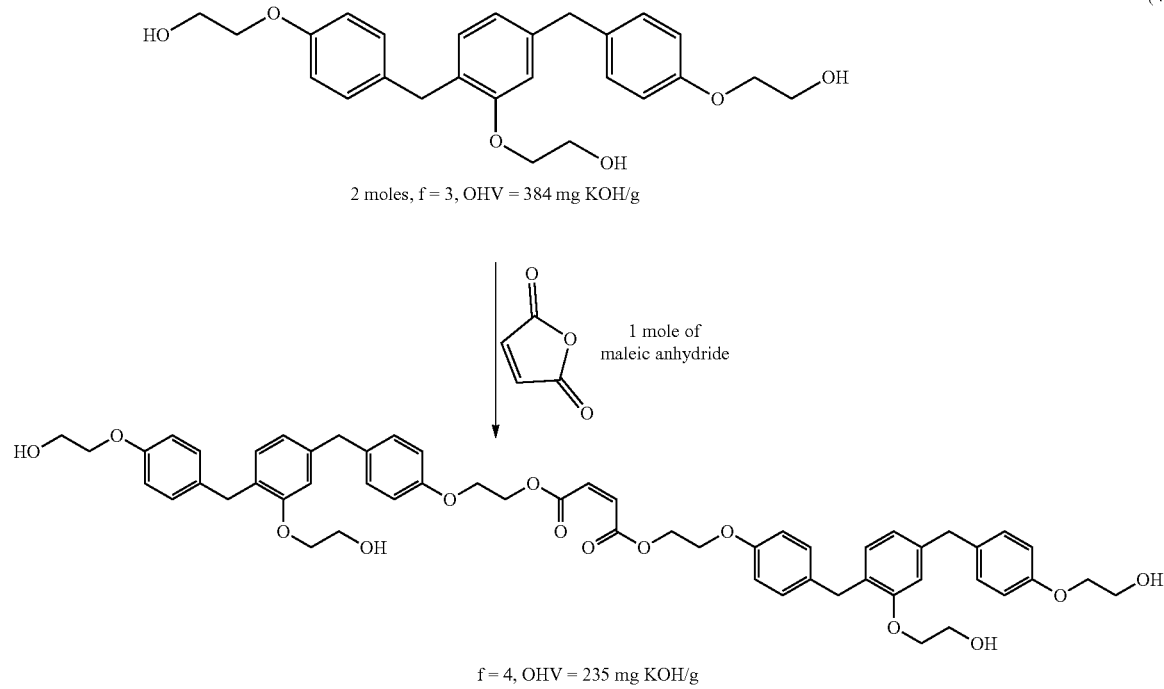

As shown in Scheme (VII), esterification of a 3-functional ethoxylated novolac with maleic anhydride results in an esterified ethoxylated novolac with a functionality of 4. This is accompanied by a significant decrease in OHV from 384 mg KOH/g to 235 mg KOH/g and a significant increase in chain length. The two ethoxylated aromatics of the esterified arylhydroxy compound are separated by a relatively long aliphatic linear chain arising from maleic diester of the anhydride and the hydroxyl of the ethoxylated group. The maleic diester acts as a chain extender creating a relatively soft segment sandwiched by two aromatic moieties. These two features of reduced hydroxyl concentration coupled with a relatively soft aliphatic soft segment makes the esterified ethoxylated novolac well suited for a polyurethane application where flexibility is desired. This scheme clearly demonstrates how this technology is differentiated from a traditional novolac-based wherein the 3-functional and 4-functional have the same rigidity and almost the same OHV.

Interestingly, if the esterification of ethoxylated BisF is carried out under similar conditions with maleic anhydride, unlike the transformation shown in Scheme (VII), the resulting esterified ethoxylated Bis F would have nearly the same functionality as the ethoxylated BisF. This is demonstrated by Scheme (VIII).

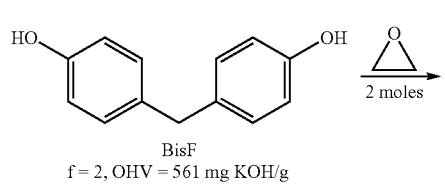 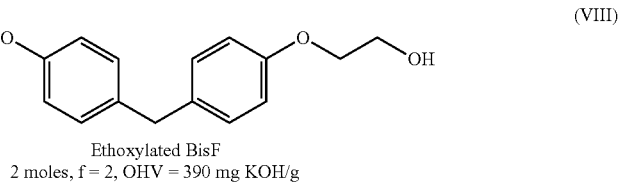

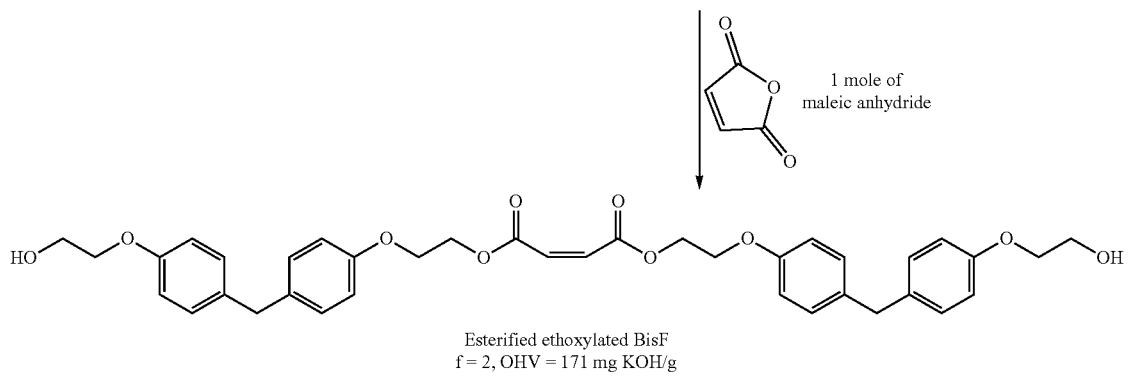

The reason why the functionality does not increase is clear from Scheme (VII) and (VIII) that unlike a 3-functional ethoxylated novolac, there is no extra hydroxyl in the aromatic backbone on each side to contribute to the overall increase. The similarity with Scheme (VII) is that esterification with maleic anhydride (that is cyclic, hence difunctional) leads to a huge reduction in OHV from 390 mg KOH/g to 171 mg KOH/g and the accompanied increase in chain length and soft segment. This is a significant transformation of the highly rigid Bis F structure to a more flexible one that could be particularly useful in thermoplastic urethane (TPU) and CASE applications.

Particular preference is given to the use of acetic anhydride if reduction in functionality is desired due to the short reaction times and the monofunctionality. In IX, the reaction of a low molecular weight phenol novolac having an average functionality of 3 with acetic anhydride is illustrated:

fied or partially esterified novolacs bring about a reduction in the degree of crosslinking between polyisocyanate component and polyol component during the formation of the polymeric composition, in particular polyurethanes/polyisocyanurates.

Partially alkoxylated arylhydroxy compounds can likewise be esterified. The products obtained can be prepared in a targeted manner such that the OH functionality is dominated by phenolic OH groups. Reaction X demonstrates the reaction of a partially ethoxylated novolac with a carboxylic acid, almost entirely the aliphatic OH group reacting with the acid. This high selectivity was rather unexpected and turns out to be quite useful as it provides novolacs with functionality close to 2 or even less as desired and almost all of the available hydroxyls are aromatic in nature and thus removes the complications that could arise from having a mixture of aliphatic and aromatic hydroxyls in the same molecule.

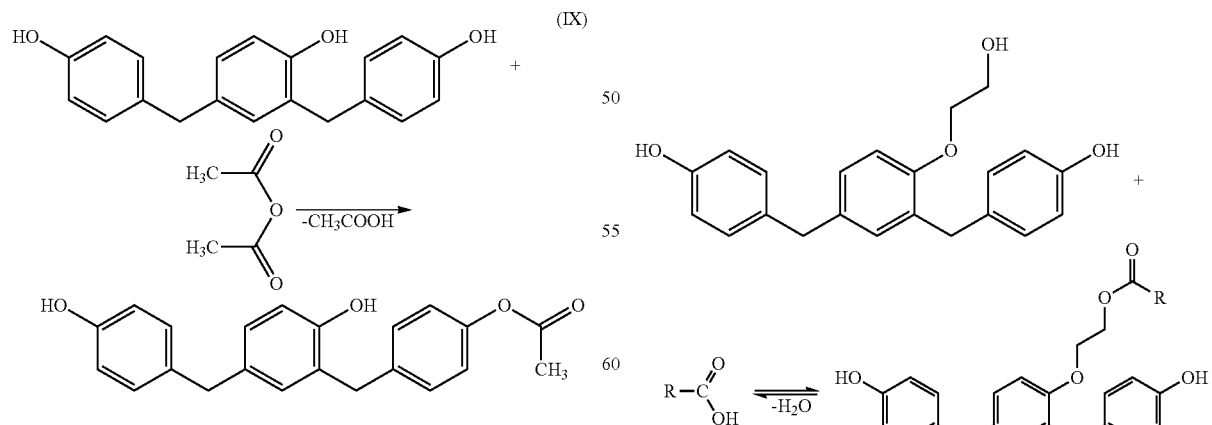

The esterification reaction is preferably to be controlled such that the OH functionality of the esterified or partially esterified novolac is between 1.8 and 2.8, preferably 2.0 to 2.5 for those applications such as PIR and CASE as described earlier. As a result of this functionality, the esteri- Traditionally the higher functionality of the novolacs, which are typically 2.5 to 6 or higher, limits their use in those applications where even lower functionality is desired.

This technology of capping selected number of phenolic hydroxyls in a given molecule allows for their use to be extended to a much wider range of polyurethane and polyisocyanurate products such as from foams to elastomers, sealants and coatings.

The esterification of arylhydroxy compounds is effected in that a reaction vessel is filled, with stirring, with a mixture of arylhydroxy compounds and optionally, a catalytically active amount of a catalyst (e.g. p-toluenesulfonic acid) for reducing the reaction time and the respectively required amount of for example monocarboxylic acid (e.g. formic acid, acetic acid), and the stirring is performed at temperatures of between 80 and 200° C. until the acid number no longer changes. Subsequently, the remainder of the carboxylic acid and water which is formed are distilled off under reduced pressure until a desired acid number (in general below 2 mg KOH/g) is achieved.

The preparation of the esterified alkoxylated or non-alkoxylated arylhydroxy compounds is performed correspondingly with carboxylic anhydrides and/or carbonyl halides. If the carboxylic anhydrides are cyclic, then there will be no acid to distill. However, the residual unreacted acid would have to be neutralized.

The preparation of an esterified alkoxylated arylhydroxy compound, wherein the arylhydroxy compound is an arylhydroxy-aldehyde resin comprising at least the following steps:

a) Production of the arylhydroxy-aldehyde resin by reacting at least one arylhydroxy compound and aldehyde in a molar ratio of from 1:0.25 to 1:0.85 with the aid of an acid or other suitable catalysts and reacting the aldehyde under reflux conditions or higher temperature in excess of 100° C., followed by the neutralization or removal of the free acid, water and the residual monomer to the desired level b) Charging a base catalyst at temperatures between 100° C. to 200° C.

c) Charging the alkoxylating agent wherein the phenolic hydroxyl groups to alkoxylating agent is in a ratio of 1:0.1 to 1:30 at temperatures between 100° C. to 200° C. and allowing the reaction to complete d) Cooling the reaction mixture down to 150° C. and neutralizing the base mixture with inorganic or organic acid e) Reacting the intermediate from the previous step with a monocarboxylic and/or dicarboxylic acid and/or their anhydrides and/or carboxylic acid halides f) Hold the reaction at around 80° C. to 200° C. until the esterification reaction is complete g) Discharge the esterified-alkoxylated-aldehyde-resin.

It is particularly advantageous if the alkoxylation reaction and the following esterification take place in the same reaction vessel, which can save time and resources. It is, however, also possible to conduct the reaction in different reaction vessels.

It is important to recognize that these esterified compounds of the invention are polyols when it comes to their use in polyurethanes or polyisocyanurates. So, they can be referred to simply as esterified polyols for the sake of simplicity. For preparing polyurethanes or polyisocyanurates, various combinations of esterified arylhydroxy compounds can be used. For instance, combinations of esters of alkoxylated and/or non-alkoxylated arylhydroxy compounds are possible. For example, an esterified ethoxylated novolac can be used in combination with an ethoxylated novolac and/or an unmodified novolac. The corresponding combinations depend on the structure and preparation of the polyurethanes or polyisocyanurates and on their desired properties. The esterified alkoxylated or non-alkoxylated arylhydroxy compounds form a co-reactant in the polyaddition reaction with isocyanates for the formation of the polyurethanes or polyisocyanurates and due to the possibility for influencing the OH functionality make it possible to broaden the spectrum of properties of polyurethanes or polyisocyanurates and the associated fields of use.

The polyurethanes or polyisocyanurates are prepared using the esterified alkoxylated or non-alkoxylated arylhydroxy compounds in a conventional manner. Further components used can thus be di- or polyisocyanates known from the prior art. Usable isocyanate components that may be mentioned preferably include m-phenylene diisocyanate, toluene 2,4-diisocyanate, toluene 2,6-diisocyanate, hexamethylene diisocyanate (HDI), tetramethylene 1,4-diisocyanate, cyclohexane 1,4-diisocyanate, hexahydrotoluene diisocyanate, naphthylene 1,5-diisocyanate, methoxyphenyl 2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyldiphenylmethane 4,4'-diisocyanate, a polymethylene polyphenyl isocyanate, polymeric diphenylmethane diisocyanate (PMDI), isophorone diisocyanate (IPDI), 4,4'-diisocyanatodicyclohexylmethane (H12MDI), toluene 2,4,6-triisocyanate and 4,4'-dimethyldiphenylmethane 2,2',5,5'-tetraisocyanate. In various embodiments, the polyisocyanate used is diphenylmethane 4,4'-diisocyanate, diphenylmethane 2,4-diisocyanate, hexamethylene 1,6-diisocyanate, isophorone diisocyanate, toluene 2,4-diisocyanate, toluene 2,6-diisocyanate or mixtures thereof. 4,4'-Diphenylmethane diisocyanate, 2,4-diphenylmethane diisocyanate and mixtures thereof are generally referred to as MDI. Toluene 2,4-diisocyanate, toluene 2,6-diisocyanate and mixtures thereof are generally referred to as TDI.

Each of the above polyisocyanates can be modified so that urethane, urea, biuret, carbodiimide, allophanate, uretonimine, isocyanurate, amide or similar bonds are incorporated. Examples of modified isocyanates of this kind include various urethane group- and/or urea group-containing prepolymers and so-called "liquid MDI" products and the like. It is also possible for the polyisocyanate to be a blocked isocyanate.

Instead of or in addition to the polyisocyanates mentioned above, suitable prepolymers can also be used as polyisocyanate component. The prepolymers are preparable by reaction of one or more isocyanates with one or more polyols, where the polyol used can in turn also be esterified alkoxylated or non-alkoxylated arylhydroxy compounds.

Further di- or polyol components from the prior art can be used for the preparation of the polyurethanes or polyisocyanurates along with the esterified alkoxylated or non-alkoxylated arylhydroxy compounds. Polyester polyols and/or polyether polyols and/or polyether ester polyols and/or polycarbonate polyols and/or polyether polycarbonate polyols may be mentioned here. Polyester polyols and/or polyether polyols are readily commercially available. The polyol component used may for example also be novolacs and/or alkoxylated novolacs. The use of for example alkoxylated novolacs, the preparation of which has already been described by way of example hereinabove, as polyol has the advantage in particular that the fire performance or reaction to fire and the cell structure can be improved further.

Depending on the specific type of the polyurethane or polyisocyanurate prepared and on the desired properties of the end product, a very great number of additional components can be involved during the reaction of the polyisocyanate compound with the esterified alkoxylated or non-alkoxylated arylhydroxy compounds. These components (auxiliaries and additives) include, but are not limited to, a variety of different polyols as mentioned above, surfactants, blowing agents (e.g. cyclopentane, n-pentane, isopentane, butane, isobutane, hexane isomers, cyclohexane, heptane isomers, cycloheptane, tetrafluoroethane, pentafluoropropane, pentafluorobutane, and/or mixtures thereof), emulsifiers, thixotropic agents, plasticizers, cell regulators, fillers, pigments and/or dyes, desiccants, reinforcers, biocides, preservatives, antioxidants, diluents, flame retardants and the like. If a flame retardant is present, the flame retardant can be a phosphorus-containing flame retardant. Examples of phosphorus-containing flame retardants include, but are not limited to, triethyl phosphate (TEP), triphenyl phosphate (TPP), tris(chloroisopropyl) phosphate (TCPP), dimethyl propane phosphate, resorcinol bis(diphenyl phosphate) (RDP), bisphenol A diphenyl phosphate (BADP) and tricresyl phosphate (TCP), dimethyl methylphosphonate (DMMP), diphenyl cresyl phosphate and aluminium diethyl phosphinate. According to the invention, however, additional flame retardants can be essentially dispensed with or the content can be reduced on account of the high aromatic content of the esterified alkoxylated or non-alkoxylated arylhydroxy compounds. The formulation may also contain diluents which can be reactive or non-reactive. These diluents act as rheology modifiers thus reducing the viscosity of the mix. Examples of diluents include polyalcohols such as ethylene glycol, glycerol or diethylene glycol, etherified polyalcohols such as monomethyl ethers of ethylene glycol or dimethyl ethers of ethylene glycol and dibasic esters of acids such as diethyl adipate, dimethyl adipate, diethyl succinate or dimethyl succinate. Mixtures of these diluents can likewise be used.

The relative amounts of polyisocyanate and of the esterified arylhydroxy compounds are selected in order to produce a polymer. The ratio of these components is generally referred to as the "isocyanate index", which represents 100 times the ratio of isocyanate groups to isocyanate-reactive groups. The isocyanate index is generally at least 50 and can be up to 1000 or more. Rigid polymers such as structural polyurethanes and rigid foams are typically prepared using an isocyanate index of from 90 to 350. If flexible or semi-flexible polymers are being prepared, the isocyanate index is generally from 50 to 125. Polymers containing isocyanurate groups have isocyanate indices of from at least 180 up to 600 or more.

In order to form polyurethanes or polyisocyanurates using esterified arylhydroxy compounds, the di- or polyisocyanate compound and the esterified arylhydroxy compounds as a polyol component and optionally further polyol components and other ingredients as described in the earlier sections are mixed and crosslinked/cured. The curing step is achieved by exposing the reaction mixture to conditions sufficing to bring the polyisocyanate compound and the polyol component(s) to reaction to form the polymer.

The polyisocyanate and the polyol component(s) in various embodiments may optionally also contain a catalyst. Examples of catalysts or catalyst systems include tertiary amines such as dimethylbenzylamine, 1,8-diazabicyclo-[5.4.0]-undec-7-ene, pentamethyldiethylenetriamine, dimethylcyclohexylamine and triethylenediamine, but are not limited to these. Potassium salts such as potassium acetate and potassium octoate can likewise be used as catalysts.

Due to the use of the esterified arylhydroxy compounds, the degree of crosslinking of the polyurethane or polyisocyanurate formed can be tailored to suit the given application. For example, the degree of crosslinking can be reduced leading to more flexible materials. In particular, this plays a significant role due to the trimer formation in polyisocyanurate polymers, in particular during foaming, since the ideal foam structure cannot form at a high degree of crosslinking. In addition, boosting the aromaticity of the system by the use of the esterified arylhydroxy compounds improves the reaction-to-fire properties of the end product. Esterification was able to reduce the viscosity of the products, for example compared to the novolac polyols, which is of great advantage for the handling and cell formation structure of the overall polyol mixture.

The esterified arylhydroxy compounds can—as already mentioned—be used to prepare polyurethanes and polyisocyanurates, particularly preferably for rigid foams but also for flexible foams and elastomers.

These can then be used for example for coatings, paints, sealants and insulation materials, adhesives and/or composite materials.

Particular preference is given to the use for a composition containing the following components:

a) at least a di- or polyisocyanate component, such as for example 4,4'-diphenylmethane diisocyanate (MDI), hexamethylene 1,6-diisocyanate (HDI), isophorone diisocyanate (IPDI), toluene 2,4-diisocyanate (TDI), trimethylhexamethylene diisocyanate, b) as diol or polyol component, at least one esterified arylhydroxy compound, for example esterified ethoxylated novolac and/or esterified propoxylated novolac, esterified novolac, c) optionally at least one further diol or polyol component, such as for example polyester polyols and/or polyether polyols and/or polyether ester polyols and/or polycarbonate polyols and/or polyether polycarbonate polyols, d) optionally a catalyst, such as for example aminic catalysts, e) optionally blowing agents such as for example n-pentane, isopentane, cyclopentane, butane, isobutane, ether compounds, f) optionally auxiliaries and additives such as for example emulsifiers, flame retardants, thixotropic agents, plasticizers, dyes, cell regulators.

EXAMPLES

The invention shall be explained in more detail on the basis of an exemplary embodiment. Although the following examples are directed to specific embodiments, they are not to be viewed as limiting in any specific respect.

a) Preparation of an Ethoxylated Novolac Having a Functionality of 3:

1. 1262.1 g of phenol are added to a reactor as a solid and are melted at temperatures of between 55-60° C.

2. 3.74 g of oxalic acid dihydrate and 3.74 g of water are subsequently added with stirring and the reaction mixture is heated to 100° C.-110° C.

3. Thereafter, 322.57 g of 45% formalin are added over 1 h at 100° C.-110° C., followed by further reaction for 3 h under reflux. The novolac is distilled in order to reduce the free phenol content (<0.3%) and water content.

4. The novolac has an Mn of approx. 306 g/mol (measured by GPC and vapour pressure osmometry) and hence an OH functionality of 3. The OH number is 550 mg KOH/g. The yield is 698.39 g.

5. For the ethoxylation of the novolac formed, 1.74 g of potassium carbonate are added directly to the resin at 170-180° C. and mixed in. 602.94 g of ethylene carbonate are fed into the reaction mixture at 175-180° C. over 5 h.

6. The temperature is maintained at 175° C. to 180° C. for 1 h, possibly even longer, for further reaction, until carbon dioxide is no longer formed and the reaction has been completed.

7. The reaction mixture is cooled down to 150° C. and 3.47 g of salicylic acid is added.

8. The resin is cooled down and poured out. The yield is 1000 g of resin.

Physical properties of the ethoxylated novolac:
Cone-and-plate viscosity at 100° C.: 320 mPa*s
Water content: 0.13%
OH number: 383 mg KOH/g
Acid number: 0.18 mg KOH/g b) Preparation of an Esterified Non-Alkoxylated Novolac by Reaction with Acetic Anhydride:

1. 293.3 g acetic anhydride are added to 879.2 g of the novolac with OH-functionality of 3 (from example a) and Mn of 306 g/mol at 100° C.-105° C. within 1.5 h.
2. The mixture is subsequently left to react for 1 h at approx. 100° C.-105° C.
3. This is followed by vacuum distillation at <60 mbar up to 180° C. until the desired value for the acid number has been reached.
4. The resin is cooled down and poured out. The yield is 1000 g of resin.

Physical properties of the esterified non-alkoxylated novolac by acetic anhydride:
Cone-and-plate viscosity at 100° C.: 370 mPa*s
Water content: 0.18%
OH number: 322 mg KOH/g
Acid number: 0.03 mg KOH/g
Functionality: 2.0 (calculated from the OH number)

c) Preparation of an Esterified Ethoxylated Novolac by Reaction with Formic Acid 1. 99.8 g of formic acid (>99%) are added to 951.6 g of the ethoxylated novolac at 95° C.
2. The mixture is subsequently left to react for 3 h at approx. 120° C.
3. This is followed by vacuum distillation at <60 mbar up to 180° C. until the desired value for the acid number has been reached.
4. The resin is cooled down and poured out. The yield is 1000 g of resin.

Physical properties of the formic acid-esterified, ethoxylated novolac:
Cone-and-plate viscosity at 100° C.: 140 mPa*s
Water content: 0.30%
OH number: 268 mg KOH/g
Acid number: 0.5 mg KOH/g
Functionality: 2.2 (calculated from the OH number)

d) Preparation of an Esterified Ethoxylated Novolac by Reaction with Acetic Acid and Catalyst 1. 4.60 g of p-toluenesulfonic acid monohydrate and 126 g of acetic acid (>99%) are added to 920.2 g of the ethoxylated novolac (from example a) at 95° C.
2. The mixture is subsequently left to react for 3 h at approx. 120° C.
3. This is followed by vacuum distillation at <60 mbar up to 150° C. until there is no longer a flow of distillate.
4. 2.72 g of KOH (50%) are added.
5. This is followed by vacuum distillation at <60 mbar up to 180° C.
6. The resin is cooled down and poured out. The yield is 1000 g of resin.

Physical properties of the acetic acid-esterified, ethoxylated novolac:
Cone-and-plate viscosity at 100° C.: 120 mPa*s
Water content: 0.30%
OH number: 258 mg KOH/g
Acid number: 0.5 mg KOH/g
Functionality: 2.2 (calculated from the OH number)

e) Preparation of an Esterified Polyethoxylated Novolac by Reaction with Formic Acid The polyethoxylated novolac is prepared by reacting a novolac with ethylene oxide. The molar ratio of novolac (Mn 306 g/mol) to ethylene oxide is 1:9. The average polyether chain length is 3.

1. 64.2 g of formic acid (>99%) are added to 980.4 g of the polyethoxylated novolac at 95° C.
2. The mixture is subsequently left to react for 3 h at approx. 120° C.
3. This is followed by vacuum distillation at <60 mbar up to 180° C. until the desired value for the acid number has been reached.
4. The resin is cooled down and poured out. The yield is 1000 g of resin.

Physical properties of the formic acid-esterified, polyethoxylated novolac:
Cone-and-plate viscosity at 25° C.: 7000 mPa*s
Water content: 0.30%
OH number: 175 mg KOH/g
Acid number: 0.5 mg KOH/g
Functionality: 2.2 (calculated from the OH number)

f) Preparation of Polyurethane Foam Using Esterified Alkoxylated Novolacs

The materials used for foam preparation are listed in table 1:

TABLE 1

| Raw materials | | |
|---|---|---|
| Component | Description | Supplier |
| Polyols | | |
| Aromatic Polyester Polyol (APP) | Recycled PET polyester polyol of f = 2, OHV 240 mg KOH/g | External |
| Sucrose-based polyether polyol (PEP) | Propoxylated sucrose/glycerol polyether polyol of f = 4.5, OHV 475 mg KOH/g | External |
| Resonance ™ PM94-001 | Esterified arylhydroxy compound of f = 2.29, OHV 351 mg KOH/g | HEXION |
| Resonance ™ PL91-104 | Esterified arylhydroxy compound of f = 2.16, OHV 167 mg KOH/g | HEXION |
| Resonance ™ PM91-054 | Esterified arylhydroxy compound of f = 2.08, OHV 251 mg KOH/g | HEXION |
| Surfactant | | |
| Surfactant A | Polyether modified polysiloxane copolymer | External |
| Catalysts | | |
| Polycat 5 | Pentamethyldiethylenetriamine | EVONIK |
| Polycat 8 | N,N-dimethylcyclohexylamine | EVONIK |
| Kosmos 75MEG | Potassium octoate/MEG/water (75/21.5/3.5) Trimerization catalyst, OHV 610 mg KOH/g | EVONIK |
| Blowing agents | | |
| n-pentane | | ALDRICH |
| Water | | |
| Flame retardant | | |
| TEP | Triethyl phosphate | ALDRICH |
| Isocyanate Component | | |
| Isotem P600 | Standard polymeric diisocyanate of f = 2, 85 | BCl |

All foams were prepared via hand-mixing using a high-torque mixer at 3,000 rpm speed. In this stage foams were prepared at 250-gram scale.

Polyol components and isocyanate components of the foam systems were put in a plastic cup and mixed for 10 seconds. Afterwards, the mixture was transferred into a plastic bag before the cream time and let free-rise. Cream time, gel time and tack-free time were measured on all foams.

Formulations were optimized in order to meet gel time and density of the reference formulation.

The optimized formulations were also used to prepare free rise blocks; the polyols and isocyanate components were put in a wood mold having a volume of 13 L. Foam blocks were cut for testing. The following tests were made on the foams.

Foam blocks were cut for testing after aging at room conditions for one day after preparation.

The following tests were made on the foam:

Dimensional stability (according to ISO 2796) at 100° C. (48 h), 70° C. 90% RH (48 h). Sample size: 100 mm×100 mm×25 mm. The test at 70° C./90% RH was also run for 7 days.

Compressive strength (according to EN 844). Sample size: 50 mm×50 mm×50 mm

Reaction to fire test B2 (according to DIN 4102). Sample size: 90 mm×200 mm×20 mm Closed cells content (according to ASTM D2856). Sample size: 60 mm×30 mm×30 mm Thermal conductivity (according to EN12667). Sample size: 100 mm×100 mm×

TABLE 2

Formulations

| Materials | OHV | Ref | A | B | C | D |
|---|---|---|---|---|---|---|
| Polyol component | | | | | | |
| APP | 240 | 55 | 45 | 45 | | 45 |
| PEP | 475 | 25 | 25 | 25 | 25 | 25 |
| Resonance™ PM94-001 | 351 | | | | | 10 |
| Resonance™ PL91-104 | 167 | | | 10 | 55 | |
| Resonance™ PM91-054 | 251 | | 10 | | | |
| Surfactant A | | 2 | 2 | 2 | 2 | 2 |
| Polycat 5 | | 0.2 | 0.15 | 0.15 | 0.1 | 0.2 |
| Kosmos 75 MEG | 610 | 0.45 | 0.45 | 0.45 | 0.45 | 0.45 |
| Polycat 8 | | 0.3 | 0.25 | 0.18 | 0.1 | 0.17 |
| TEP | | 10 | 10 | 10 | 10 | 10 |
| n-pentane | | 4.1 | 4.1 | 4.05 | 3.81 | 4.15 |
| Water | 6233 | 1.5 | 1.75 | 1.73 | 1.63 | 1.78 |
| Total | | 98.80 | 98.7 | 98.56 | 98.09 | 98.75 |
| Isocyanate component | | | | | | |
| Isotem P600 | | 115 | 115 | 112.5 | 101.5 | 118.5 |
| Iso Excess | | 12.0 | 11.9 | 12.0 | 12.0 | 12.0 |
| Index | | 129 | 128 | 129 | 131 | 128 |
| Reaction profile and density | | | | | | |
| Cream time (s) | | 20 | 22 | 22 | 21 | 21 |
| Gel time (s) | | 61 | 62 | 64 | 64 | 60 |
| Tack free time (s) | | 85 | 98 | 105 | 110 | 80 |
| Free rise density (Kg/m³) | | 37.4 | 37.7 | 37.4 | 36.5 | 38.1 |

30 mm

Dimensional stability was tested measuring the specimen with a micrometer before and after the conditioning.

Compressive strength was measured on all the dimensions of the specimen using a LLYOD LR 30K dynamometer with a 5 KN load cell.

Reaction to fire was tested using a closed fume cupboard equipped with a small bunsen.

PUR foams were prepared according to the formulations listed in Table 2:

TABLE 3

B2 test

| | Ref | A | B | C | D |
|---|---|---|---|---|---|
| Height of the flame | | | | | |
| Average (cm) | 17.5 | 15.6 | 15.0 | 17.6 | 13.8 |

TABLE 4

Compressive properties

| | Ref | A | B | C | D |
|---|---|---|---|---|---|
| Parallel to length | | | | | |
| At 10 % strain (kPa) | 283 | 282 | 254 | 265 | 290 |
| Perpendicular to length | | | | | |
| At 10 % strain (kPa) | 93 | 98 | 89 | 94 | 108 |

TABLE 5

Dimensional stability (average volume deformation)

| | Ref | A | B | C | D |
|---|---|---|---|---|---|
| 48 h 70° C./90% RH | −10.18 | −5.27 | −8.16 | −2.67 | −1.99 |
| 7 Days 70° C./90% RH | −0.92 | −0.01 | −0.80 | 0.04 | −0.37 |
| 48 h 100° C. | −1.38 | −0.35 | −0.60 | 1.64 | −1.99 |

TABLE 6

Closed cells content

| | Ref | A | B | C | D |
|---|---|---|---|---|---|
| Closed cells (%) | 88.16 | 89.26 | 87.99 | 86.12 | 89.10 |

Table 2 provides the formulation details of the PUR foams designated as Ref (Reference) and A-D. The Ref foam is made from APP along with sugar-based PEP. The test foams A-D were made by replacing APP partially or completely by the esterified arylhydroxy polyols of varying OHV. The level of replacement of APP were ca. 20% for foams A, B and D and 100% for foam C. The formulations containing the esterified polyols were found to be more reactive and hence, the catalysts had to be reduced just a little in order to optimize the foams which involves matching the cream time, gel time and density of all the foams. All other ingredients were kept the same and the isocyanate index was maintained at around 130 for all foams. This makes the properties of the foams comparable to one another.

The fire behaviour of the foam is described herein as reaction to fire and is based on the performance of these foams in the vertical burn test, called the B2 test as mentioned earlier which is a measure of the length of the fire spread. Accordingly, a reduction in the length of the fire spread, indicates improved fire performance.

Table 3 shows that when esterified polyols are used as partial replacement of aromatic polyester polyol, the reaction to fire is significantly better than the reference. Three out of four of the esterified arylhydroxy polyols were found to decrease the burn height anywhere between 11% to 21% compared to the reference. Formulation D performed the best with the lowest flame spread.

Mechanical properties are assessed by compressive strength—both parallel and perpendicular to the foam rise and dimensional stability of the foams. Overall, the compressive strengths of the foams containing esterified polyols seem to be either equal or slightly better than that of the reference (Table 4). However, in all variants according to the invention, the dimensional stability was significantly improved, after 2 days (48 hours) and after 7 days at 70/90% RH as shown in Table 5. The 48 hours test show that the foams produced from esterified arylhydroxy polyols exhibit volume deformation anywhere between 20% to 80% less than the reference. Similarly, the 7-day test revealed improvements anywhere between 13% to almost 100% compared to the reference.

Thus, the significant improvement in reaction to fire comes with nearly equivalent or better mechanical properties as indicated by similar or slightly better compressive strength overall and significant improvements in dimensional stability of the foams containing esterified polyols compared to the reference foam.

g) Preparation of Polyisocyanurate Foams (PIR) Using Esterified Alkoxylated Novolacs The materials used to manufacture polyisocyanurate foam are listed in Table 7:

TABLE 7

Raw materials for PIR Formulations

| Component | Description | Supplier |
|---|---|---|
| Polyols | | |
| APP | A recycled PET polyester polyol off f = 2, OHV 240 mg KOH/g | External |
| Resonance ™ PM94-001 | Esterified arylhydroxy compound of f = 2.29, OHV 351 mg KOH/g | HEXION |
| Resonance ™ PL91-104 | Esterified arylhydroxy compound of f = 2.16, OHV 167 mg KOH/g | HEXION |
| Resonance ™ PM91-054 | Esterified arylhydroxy compound of f = 2.08, OHV 251 mg KOH/g | HEXION |
| Resonance ™ PM91-001 | Ethoxylated novolac of f = 3, OHV 385 mg KOH/g | HEXION |
| Resonance ™ PL91-205 | Ethoxylated novolac of f = 3, OHV 240 mg KOH/g | HEXION |

TABLE 7-continued

Raw materials for PIR Formulations

| Component | Description | Supplier |
|---|---|---|
| Resonance ™ PM92-501 | Phenol novolac of f = 3, OHV 550 mg KOH/g | HEXION |
| Surfactant | | |
| Surfactant A | Polyether modified polysiloxane copolymer | External |
| Catalysts | | |
| Polycat 41 | Triazine catalyst | EVONIK |
| Kosmos 45 MEG | Potassium acetate/MEG/Water (45/52/3) Trimerization catalyst, OHV 1127 | EVONIK |
| Kosmos 75MEG | Potassium octoate/MEG/water (75/21.5/3.5) Trimerization catalyst, OHV 610 | EVONIK |
| Blowing agents | | |
| n-pentane | | ALDRICH |
| Water | | |
| Flame retardant | | |
| TEP | Triethyl phosphate | ALDRICH |
| Isocyanate Component | | |
| Isotem P600 | Standard polymeric diisocyanate of f = 2, 85 | BCl |

The polyisocyanurate foams were produced in accordance with the polyurethane foams described above. The properties were also determined as described.

TABLE 8

PIR Formulations comparing the Esterified Resonance polyols vs Ref polyol and other non-esterified control polyols as described in Table 7.

| Materials | OHV | Ref | A | B | C | D | E | F | G |
|---|---|---|---|---|---|---|---|---|---|
| APP | 240 | 90 | 80 | 80 | | 80 | 80 | 80 | 80 |
| Resonance ™ PM94-001 | 351 | | | | | 10 | | | |
| Resonance ™ PL91-104 | 167 | | | 10 | 90 | | | | |
| Resonance ™ PM91-054 | 251 | | 10 | | | | | | |
| Resonance ™ PM91-001 | | | | | | | 10 | | |
| Resonance ™ PL91-205 | | | | | | | | 10 | |
| Resonance ™ PM92-501 | | | | | | | | | 10 |
| Surfactant A | | 3 | 3 | 3 | 3 | 3 | 3 | 3 | 3 |
| Kosmos 45 MEG | 1127 | 0.7 | 0.7 | 0.7 | 0.7 | 0.7 | 0.7 | 0.7 | 0.7 |
| Kosmos 75 MEG | 610 | 1 | 1 | 1 | 1 | 1 | 1 | 1 | 1 |
| Polycat 41 | | 0.5 | 0.4 | 0.38 | | 0.3 | 0.4 | 0.38 | 0.3 |
| TEP | | 10 | 10 | 10 | 9 | 10 | 10 | 10 | 10 |
| n-pentane | | 15 | 15 | 15 | 14.0 | 15.2 | 14.8 | 15.2 | 15.9 |
| Water | 6233 | 1.5 | 1.5 | 1.46 | 1.16 | 1.51 | 1.32 | 1.3 | 1.35 |
| Total | | 121.70 | 121.60 | 121.54 | 118.86 | 121.71 | 121.22 | 121.58 | 122.25 |
| Isotem P600 | | 237 | 238 | 235 | 202 | 245 | 242 | 238 | 251 |
| Iso Excess | | 44.8 | 44,9 | 44.9 | 44.9 | 44.3 | 44.7 | 44.9 | 44.6 |
| Index | | 309 | 310 | 314 | 347 | 297 | 304 | 310 | 295 |
| Cream time (s) | | 20 | 20 | 22 | 18 | 22 | 23 | 22 | 20 |
| Gel time (s) | | 70 | 72 | 73 | 67 | 74 | 70 | 65 | 67 |
| Tack free time (s) | | 120 | 123 | 145 | 123 | 124 | 123 | 128 | 120 |
| Free rise density (Kg/m$^3$) | | 32.3 | 32.6 | 31.5 | 34.3 | 32.0 | 32.7 | 32.6 | 34.8 |

TABLE 9

B2 Test

|              | Ref | A   | B   | C   | D   | E    | F    | G    |
|--------------|-----|-----|-----|-----|-----|------|------|------|
| Average (cm) | 9.8 | 9.0 | 8.0 | 7.8 | 9.2 | 10.3 | 10.5 | 13.3 |

TABLE 10

Compressive properties normalized to a density of 32 kg/m³

|                     | Ref | A   | B   | C   | D   | E   | F   | G   |
|---------------------|-----|-----|-----|-----|-----|-----|-----|-----|
| Parallel to length  |     |     |     |     |     |     |     |     |
| At 10% strain (kPa) | 256 | 270 | 243 | 277 | 269 | 270 | 267 | 265 |
| Perpendicular to length |  |     |     |     |     |     |     |     |
| At 10% strain (kPa) | 77  | 83  | 81  | 103 | 83  | 92  | 98  | 94  |

TABLE 11

Dimensional stability (average volume deformation)

|                   | Ref | A   | B   | C   | D   | E   | F   | G   |
|-------------------|-----|-----|-----|-----|-----|-----|-----|-----|
| 48 h 70° C./90% RH | 3.2 | 3.4 | 2.3 | 2.0 | 2.8 | 1.4 | 1.2 | 2.5 |
| 7 Days 70° C./90% RH | 3.6 | 4.2 | 3.3 | 2.7 | 3.8 | 2.2 | 2.5 | 3.4 |
| 48 h 100° C.      | 2.5 | 3.5 | 2.7 | 2.9 | 3.4 | 2.1 | 2.3 | 3.6 |

TABLE 12

Closed Cell Content

|                | Ref   | A     | B     | C     | D     | E     | F     | G     |
|----------------|-------|-------|-------|-------|-------|-------|-------|-------|
| Closed cells (%) | 86.62 | 87.12 | 88.03 | 88.02 | 89.16 | 89.24 | 88.60 | 89.68 |

TABLE 13

Friability

|               | Ref  | A    | B    | C    | D   | E    | F    | G   |
|---------------|------|------|------|------|-----|------|------|-----|
| Friability (%) | 16.5 | 13.0 | 15.4 | 17.3 | 8.5 | 15.0 | 10.7 | 4.6 |

Table 7 shows the raw materials used for the performance evaluation of esterified polyols of the invention in PIR foams. The polyols, besides the reference APP and the four esterified polyols used in this study, are ethoxylated novolacs of different OHV and a phenol novolac.

Table 8 has the formulation details of all the foams made with Reference APP, the four esterified polyols of different OHV (A-D), the two ethoxylated novolacs (E & F) and the novolac (G). In this study, while the APP serves as the true reference polyol with 100% APP, the foams E, F and G serve as additional references or controls. All test polyols-esterified or non-esterified replace the APP at ca. 11% from formulation A-G except for C where the esterified polyol replace 100% of the APP.

The iso excess (excess of isocyanate group relative to the active-hydrogen containing groups in the reaction mix) was kept constant while the iso index was allowed to vary depending on the OHV of the polyol. Except for C, the iso index also remained essentially constant across the table. All foam formulations were optimized to the cream time, gel time and density close to that of the reference foam (Ref). Thus, the properties of the prepared foams were made comparable to each other. Foams C and G were slightly higher in density and hence, normalizing their compressive properties made them comparable.

Similar to the PUR study, here again, the esterified polyols show significant improvement in reaction to fire. The foams with esterified polyols A-D burnt 6-20% less than the REF foam, 12-25% less than E & F (the two additional reference foams) and 31-40% less than G (the third additional reference foam). The B2 tests clearly demonstrates the effectiveness of the ester-capped polyol in reducing the flame spread over that of the APP, non-esterified ethoxylated counterpart and the novolac itself.

Table 10 shows that overall the foams made with esterified polyols exhibit improved compressive strengths than the reference. The compressive strength measured parallel to the foam rise shows a slight improvement anywhere between 5 to 8% than the reference. The slightly decreased compressive strength of foam B seems to be an anomaly considering the fact that when that esterified polyol was used at 100% loading (Foam C), the compressive strength only improved. In addition, the compressive strength perpendicular to the foam rise also showed improvement for the foams containing the esterified polyols A through D compared to the reference foam. Here, the improvement was even more significant. Formulation C wherein PL91-104 replaced all of the APP, compressive strength increased by 34% compared to the reference foam. The same foam also exhibited the best reaction to fire of all the samples.

While the foams containing the corresponding non-esterified polyols E and F and the novolac polyol G also showed significantly better compressive strength than the reference, their reaction to fire were inferior. The esterified polyols in this PIR study outperformed all the reference samples both from mechanicals and reaction to fire properties.

All foams were found to be dimensionally stable and no significant differences could be found among them. The friability data as shown in Table 13 shows some interesting and unexpected results particularly related to the esterified polyols.

The phenol novolac containing foam G exhibited the lowest friability of all the foams-almost 4 times less friable than the reference, APP foam. While the friability of the foams containing the esterified polyols, A-C were similar to that of the non-esterified ethoxylated novolacs E and F, an unexpected sudden but significant improvement in friability with foam D was observed. The friability of foam D is only half of the reference foam and is the closest to the least friable novolac based G. Since the foams A, B and D involve same level of replacement of the APP by the respective esterified polyols, the direct correlation between the concentration of the ester group on friability can be deduced. As the concentration of the ester functionality in the esterified polyol increase from B to A to D as indicated by the increasing OHV, friability seems to decrease in the same order thus reaching lowest with D, which is the most compact molecule with highest OHV and lowest molecular weight of the three esterified polyols.

These improvements in mechanical properties such as compressive strengths brought out by replacing APP partially or completely with these esterified polyols can allow the formulators to decrease the density of the foams to achieve the same level of performance, which could result in cost savings. In addition, the use of these esterified arylhydroxy polyols allows the formulators to reduce the flame retardants needed to achieve the desired level of fire performance, which could lead to other potential benefits.

What is demonstrated here is a small glimpse of the potential benefits of these esterified polyols in PUR and PIR foams. Also, in the examples shown, only the APP was replaced. It is conceivable that these esterified polyols have the potential to replace aliphatic polyether polyols (APEP), which are commonly used in a PUR for instance, to provide even larger improvement in reaction to fire performance than what is seen when replacing APP. However, since APEPs typically have high functionality, the choice of the specific esterified arylhydroxy compound and the amount of replacement of APEP may vary in order to maintain or improve the required mechanical properties. Thus, the esterified arylhydroxy compounds have the potential to replace two of the most common class of traditional polyols, partially or completely, and thereby extend their use not only in foams but also across a wider spectrum of polyurethane applications such as elastomers, sealants, coatings and adhesives.

Thus, the superior fire performance and improved mechanical properties of these esterified arylhydroxy compounds can be attributed to the relatively high aromaticity built on a phenolic (arylhydroxy) backbone, the presence of the ester group that helps tailor the functionality, optimal hydroxyl equivalent weight and compatibility with other ingredients such as the co-polyols and isocyanates.

Other specific embodiments provided herein further include the following numbered paragraphs:

1. An esterified alkoxylated or non-alkoxylated arylhydroxy compound produced by reaction of an alkoxylated or non-alkoxylated arylhydroxy compound and monocarboxylic acids, dicarboxylic acids or their anhydrides, or carboxylic acid halides for the production of polyurethane or polyisocyanurates.

2. The esterified alkoxylated or non-alkoxylated arylhydroxy compound according to claim 1 with a hydroxyl functionality ranging from 1 to 10.

3. The esterified alkoxylated arylhydroxy compound according to at least one of the preceding paragraphs 1 to 2, wherein the arylhydroxy compound is reacted first with an alkoxylating agent followed by an esterification reaction to result in an esterified-alkoxylated-arylhydroxy-compound.

4. The esterified alkoxylated arylhydroxy compound according to paragraph 3, characterized in that the degree of alkoxylation of the alkoxylated arylhydroxy compound is from 5 to 100%, preferably from 30 to 100%.

5. The esterified alkoxylated arylhydroxy compound according to paragraph 3 or 4 or both, wherein the alkoxylating agent is selected from ethylene oxide, propylene oxide, ethylene carbonate, propylene carbonate, butylene oxide, butylene carbonate or combinations thereof.

6. The esterified alkoxylated arylhydroxy compound according to at least one of paragraphs 3 to 5, characterized in that the alkoxylated arylhydroxy compound is an ethoxylated and/or propoxylated and/or a mixture of ethoxylated and propoxylated arylhydroxy-aldehyde resin.

7. The esterified alkoxylated or non-alkoxylated arylhydroxy compound according to paragraph 1, wherein the arylhydroxy compound is a phenol-formaldehyde resin.

8. The esterified alkoxylated arylhydroxy compound according to paragraph 7, characterized in that the molar mass of the esterified-alkoxylated resin is from Mn 270 to 4000 g/mol, preferably from 375 to 2010 g/mol.

9. The esterified alkoxylated or non-alkoxylated arylhydroxy compound according to paragraph 1, wherein the monocarboxylic acid is selected from formic acid, acetic acid, benzoic acid, propionic acid, caprylic acid and/or mixtures thereof.

10. The esterified alkoxylated or non-alkoxylated arylhydroxy compound according to paragraph 1, wherein the dicarboxylic acid is selected from the group of, adipic acid, succinic acid, maleic acid, fumaric acid, phthalic acid, isophthalic acid, terephthalic acid, and/or mixtures thereof.

11. The esterified alkoxylated or non-alkoxylated arylhydroxy compound according to paragraph 1, wherein the anhydride is selected from acetic anhydride, succinic anhydride, phthalic anhydride, isophthalic anhydride, maleic anhydride, tetrahydrophthalic anhydride and/or mixtures thereof.

12. The esterified alkoxylated arylhydroxy compound of paragraph 3 wherein the arylhydroxy compound is an arylhydroxy-aldehyde resin.

13. A process for producing an arylhydroxy-aldehyde resin by reacting at least one arylhydroxy compound and aldehyde in a molar ratio of from 1:0.25 to 1:0.85 with the aid of an acid or other suitable catalysts and reacting the aldehyde under reflux conditions or higher temperature in excess of 100° C., followed by the neutralization or removal of the free acid, water and the residual monomer to the desired level 14. The process according to paragraph 13, further comprising charging a base catalyst at temperatures between 100° C. to 200° C.

15. The process according to paragraph 13 or 14, further comprising charging the alkoxylating agent, wherein the phenolic hydroxyl groups to alkoxylating agent is in a ratio of 1:0.1 to 1:30 at temperatures between 100° C. to 200° C. and allowing the reaction to complete 16. The process according to any paragraph 15, further comprising cooling the reaction mixture down to 150° C. and neutralizing the base mixture with inorganic or organic acid.

17. The process according to paragraph 16, further comprising reacting the intermediate from the previous step with a monocarboxylic or dicarboxylic acid or their anhydrides or carboxylic acid halides, or any combination thereof.

18. The process according to paragraph 17, further comprising holding the reaction at around 80° C. to 200° C. until the esterification reaction is substantially complete.

19. The process according to paragraph 18, further comprising discharging the esterified-alkoxylated-arylhydroxy-aldehyde-resin.

20. The process according to paragraphs 12 to 19 wherein the intermediate steps of arylhydroxy-aldehyde resin formation, its reaction with alkoxylating agent and the subsequent esterification can be carried out in the same reaction vessel or multiple reaction vessels.

21. Use of the esterified alkoxylated or non-alkoxylated arylhydroxy compound in a composition, the compound comprising: an esterified alkoxylated or non-alkoxylated arylhydroxy compound and an isocyanate with or without a base catalyst along with other ingredients such as e.g. di- or polyols, blowing agents, surfactants and/or fillers.

23. Use of the esterified alkoxylated or non-alkoxylated arylhydroxy compound in a composition, the compound comprising:

a) at least a di- or polyisocyanate component, such as for example 4,4'-diphenylmethane diisocyanate (MDI), polymeric MDI (PMDI), hexamethylene 1,6-diisocyanate (HDI), isophorone diisocyanate (IPDI), toluene 2,4-diisocyanate (TDI), trimethylhexamethylene diisocyanate, b) as diol or polyol component, at least one esterified arylhydroxy compound, for example esterified ethoxylated novolac and/or esterified propoxylated novolac, esterified novolac, c) optionally at least one further diol or polyol component, such as for example polyester polyols and/or polyether polyols and/or polyether ester polyols and/or polycarbonate polyols and/or polyether polycarbonate polyols, d) optionally a catalyst, such as for example aminic catalysts, e) optionally blowing agents such as for example n-pentane, isopentane, cyclopentane, butane, isobutane, ether compounds, f) optionally auxiliaries and additives such as for example emulsifiers, flame retardants, thixotropic agents, plasticizers, dyes, cell regulators.

24. Use of the esterified alkoxylated or non-alkoxylated arylhydroxy compound according to any paragraph 1 to 11 for the production of polyurethane elastomers.

25. Use of the esterified alkoxylated or non-alkoxylated arylhydroxy compound according to any paragraph 1 to 11 for the production of polyurethane and polyisocyanurate products such as foams, coatings, adhesives, sealants and insulation materials.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, meaning the values take into account experimental error, machine tolerances and other variations that would be expected by a person having ordinary skill in the art.

The foregoing has also outlined features of several embodiments so that those skilled in the art can better understand the present disclosure. Those skilled in the art should appreciate that they can readily use the present disclosure as a basis for designing or modifying other methods or devices for carrying out the same purposes and/or achieving the same advantages of the embodiments disclosed herein. Those skilled in the art should also realize that such equivalent constructions do not depart from the spirit and scope of the present disclosure, and that they can make various changes, substitutions, and alterations herein without departing from the spirit and scope of the present disclosure, and the scope thereof is determined by the claims that follow.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for producing an esterified-alkoxylated-arylhydroxy-aldehyde-resin, comprising:
   producing an arylhydroxy-aldehyde resin by reacting a reaction mixture of at least one arylhydroxy compound and at least one aldehyde in a molar ratio of from 1:0.25 to 1:0.85 in the presence of an acid, under reflux conditions having a temperature of 100° C. or more;
   removing any free acid, water and residual monomer to a desired level;
   charging a base catalyst to the reaction mixture at temperatures between 100° C. to 200° C.;
   charging an alkoxylating agent to the reaction mixture wherein a ratio of phenolic hydroxyl groups to alkoxylating agent is 1:0.1 to 1:30 at temperatures of 100° C. to 200° C.;
   neutralizing the cooled reaction mixture with inorganic or organic acid;
   reacting the neutralized reaction mixture with a monocarboxylic or dicarboxylic acid or their anhydrides or carboxylic acid halides and holding the reaction at around 80° C. to 200° C. until the esterification reaction is complete; and
   discharging the esterified-alkoxylated-arylhydroxy-aldehyde-resin.

2. The process of claim 1 wherein the arylhydroxy-aldehyde resin formation, its reaction with the alkoxylating agent and the subsequent esterification are carried out in the same reaction vessel or multiple reaction vessels.

3. The process of claim 1, wherein the esterified-alkoxylated-arylhydroxy-aldehyde-resin has a hydroxyl functionality ranging from 1 to 10.

4. The process of claim 1, wherein a degree of alkoxylation of the arylhydroxy-aldehyde resin is from 30 to 100%.

5. The process of claim 1, wherein the alkoxylating agent is ethylene oxide, propylene oxide, ethylene carbonate, propylene carbonate, butylene oxide, butylene carbonate or combinations thereof.

6. The process of claim 4, wherein the esterified-alkoxylated-arylhydroxy-aldehyde resin is an ethoxylated and/or propoxylated and/or a mixture of ethoxylated and propoxylated arylhydroxy-aldehyde resin.

7. The process of claim 1, wherein the arylhydroxy compound is a phenol-formaldehyde resin.

8. The process of claim 1, wherein the esterified-alkoxylated-arylhydroxy-aldehyde-resin has a molar mass of from Mn 270 to 4000 g/mol.

9. The process of claim 1, wherein the monocarboxylic acid is formic acid, acetic acid, benzoic acid, propionic acid, caprylic acid or mixtures thereof.

10. The process of claim 1, wherein the dicarboxylic acid is selected from the group consisting of: adipic acid, succinic acid, maleic acid, fumaric acid, phthalic acid, isophthalic acid, terephthalic acid, and mixtures thereof.

11. The process of claim 1, wherein the anhydride is selected from the group consisting of: acetic anhydride, succinic anhydride, phthalic anhydride, isophthalic anhydride, maleic anhydride, tetrahydrophthalic anhydride and mixtures thereof.

12. The process of claim 3, wherein the esterified-alkoxylated-arylhydroxy-aldehyde-resin has a hydroxyl functionality ranging from 1.5 to 2.5.

13. A process for producing an esterified-alkoxylated-arylhydroxy-aldehyde-resin, comprising:
   reacting at least one arylhydroxy compound and at least one aldehyde in a molar ratio of from 1:0.25 to 1:0.85 in the presence of an acid, under reflux conditions;
   removing any free acid, water and residual monomer to provide a first reaction product;
   reacting the first reaction product with a base catalyst to provide a second reaction product;
   adding at least one alkoxylating agent to the second reaction product to provide a third reaction product, wherein a ratio of phenolic hydroxyl groups to alkoxylating agent in the third reaction product is 1:0.1 to 1:30;
   adding at least one inorganic or organic acid to neutralize the third reaction product; and
   reacting the neutralized reaction product with a monocarboxylic or dicarboxylic acid or their anhydrides and/or one or more carboxylic acid halides to provide an esterified-alkoxylated-arylhydroxy-aldehyde-resin having a hydroxyl functionality of from 1 to 10.

14. The process of claim 13, wherein the esterified-alkoxylated-arylhydroxy-aldehyde-resin has a hydroxyl functionality of from 1.5 to 2.5.

15. The process of claim 13 wherein the arylhydroxy-aldehyde resin formation, its reaction with the alkoxylating agent and the subsequent esterification are carried out in the same reaction vessel.

16. The process of claim 13, wherein the esterified-alkoxylated-arylhydroxy-aldehyde-resin has a molar mass of from Mn 270 to 4000 g/mol.

\* \* \* \* \*